United States Patent [19]

Cappi

[11] Patent Number: 4,877,478
[45] Date of Patent: Oct. 31, 1989

[54] DEVICE FOR CONTINUOUS HOT-SEALING OF THERMOPLASTIC FILMS

[75] Inventor: Angelo Cappi, Vignola, Italy
[73] Assignee: Awax S.r.L., Modena, Italy
[21] Appl. No.: 148,436
[22] Filed: Jan. 27, 1988
[30] Foreign Application Priority Data
  Feb. 13, 1987 [IT] Italy ............................... 40012 A/87
[51] Int. Cl.⁴ ............................................. B30B 15/34
[52] U.S. Cl. ................................... 156/555; 156/73.6; 156/580.1; 156/583.1
[58] Field of Search ................. 156/73.1, 73.4, 73.6, 156/580.1, 580.2, 555, 583.1, 583.2

[56] References Cited
U.S. PATENT DOCUMENTS

| | | | |
|---|---|---|---|
| 3,439,392 | 4/1969 | McNab, Jr. ........................ | 156/580.1 |
| 3,505,136 | 4/1970 | Attwood .......................... | 156/580.1 |
| 3,703,427 | 11/1972 | Sellers et al. ..................... | 156/583.2 |
| 3,787,257 | 1/1974 | Akerlund ......................... | 156/580.1 |
| 4,353,776 | 10/1982 | Giulie et al. ..................... | 156/583.1 |

Primary Examiner—Michael Wityshyn
Attorney, Agent, or Firm—Cohen, Pontani & Lieberman

[57] ABSTRACT

The present invention relates to a device for continuous hot-sealing of thermoplastic films.

This device comprises a sealing head, the sealing head being provided with two rip cord electric resistances that are heated by causing an electric current to flow therethrough and being made of a material the electric resistance of which is proportional to the temperature, the sealing head being caused to rapidly vibrate against a counter-plate so as to cause the thermoplastic film to be sealed to be rapidly pounded as it glides between the head and the counter-plate. The sealing of the thermoplastic films is brought about by the synergistic action of the heat of the resistances and of the pressure due to the pounding.

6 Claims, 1 Drawing Sheet

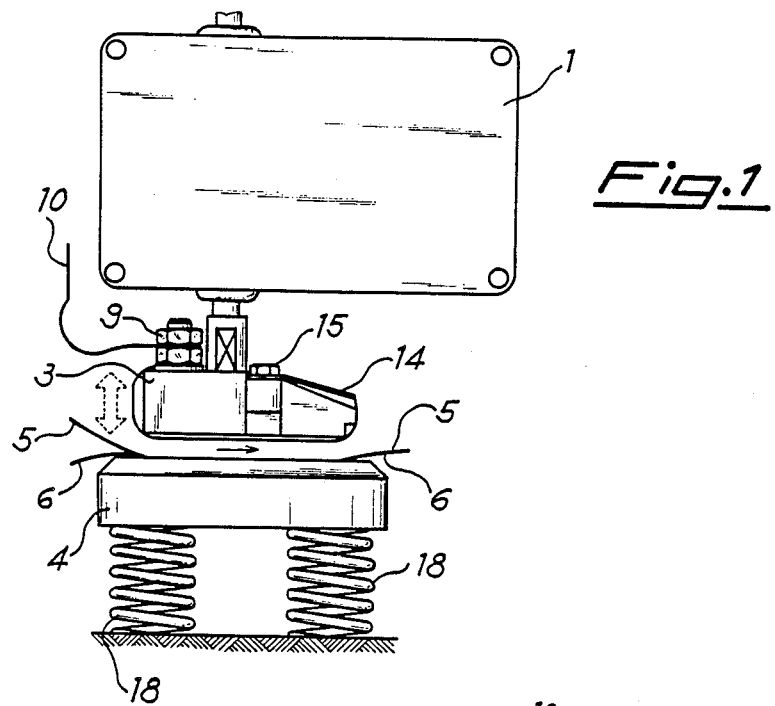

DEVICE FOR CONTINUOUS HOT-SEALING OF THERMOPLASTIC FILMS

The present invention relates to a device for continuous hot-sealing of thermoplastic films.

It is known to cause two superimposed thermoplastic films to be sealed by heating said films in the area in which one wishes them to be sealed and subjecting said area to a pressure thereby to cause the two heat softened areas to stick to each other. Devices having a sealing head to carry out said sealing are known, said sealing head being provided with a heating element that presses the thermoplastic films to be sealed against a counter-plate so as to achieve the adhesion of the films in the heated area.

This kind of device exhibits the drawback that it cannot be operated at a high speed and requires therefore rather a long time to carry out the sealing; in the second place it is quite difficult to control the temperature of the heated element with the consequence that, according to whether said temperature is too high or too low, the heated thermoplastic film will adhere to the heated element, or the sealing will be performed with poor quality.

It is the object of the present invention to eliminate the above-mentioned drawbacks by providing a device that can be operated at a high speed and that allows the temperature of the heated element to be easily and precisely controlled.

It is an advantage of the subject device that the thermoplastic films do not creep but for a very short time on the surface of the heated element and they do not stay for a long time in contact with the surface of said element; in this way, the danger is avoided that the softened thermoplastic film sticks to the heated element.

The above-mentioned and other objects and advantages are all achieved by means of the device of the present invention, which comprises: a sealing head, said head being provided with at least one heated element that is brought into contact with the thermoplastic film to heat it; a counter-plate that is placed close to the sealing head for the films to be sealed to slide between said sealing head and said counterplate; said device being characterized in that it comprises drive means suitable to cause said sealing head and said counterplate to perform a rapid reciprocating motion that causes them to approach and depart, thereby causing the films that slide between the sealing head and the counterplate to be rapidly pounded.

Other features and advantages of the invention will be evident from the following detailed description of a preferred non-limiting embodiment of the device that is the object of the present invention and from the enclosed drawings that are to describe merely by way of a non-limiting example said device, in which:

FIG. 1 is a diagrammatic view of the device of the present invention;

FIG. 2 is a perspective view, partly in section, of the sealing head.

The device of the present invention comprises a sealing head 3 which is provided with two heated elements, said heated elements consisting of electric resistances of the plate-type 8 which are heated by supplyng them with the electric power; said resistances 8 are arranged in parallel to each other at a distance from each other that is related to the distance from each other at which the welding seams will be provided on the thermoplastic film. The resistances 8 are wound on the body 7 of the sealing head and their ends are fixed by means of screws 9 and 15 to said body 7. The resistances 8 are insulated from the metal body 7 of the sealing head of the areas corresponding to bushings 11, that are made of insulating material, and to the insulating material 12; the resistances are connected in series with each other through contact with area 13 of the metallic body 7. The electric power is supplied to the resistances through wire terminals 10 that are in electrical connection with screws 9 that act as terminals.

For the purpose of keeping the mechanical tension of resistances 8 constant, which tension might change due to expansion caused by changes of the temperature of said resistances, there is provided an elastic item consisting of leaf spring 14, said elastic item being inserted between the resistances and the body of the sealing head and providing adjustment for accommodating possible expansion of the resistances and always keeping under mechanical tension said resistances.

The resistances 8 are made of a material the electrical resistance of which is directly related to the temperature. In particular, resistances 8 are made of nickel-iron alloy.

The above-mentioned feature allows, by simply detecting the electrical parameters, like voltage at the terminals of the resistances and intensity of the current flowing through the resistances, to continuously detremine the instantaneous electrical resistance of resistances 8 and, as a consequence, their temperature. In this way it is possible, by comparing the readings with the values corresponding to the target temperature of the resistances 8, to continuously adjust the temperature of resistances 8 to the target value by suitably controlling the power supply to the resistances. All the detection and control means therefor used are of a known and ordinary type.

The device also comprises a counter-plate 4 that is arranged close to the sealing head 3 and parallel therewith; the counter-plate 4 is provided with shock absorbers consisting of springs 18.

The sealing head and counter-plate are caused to perform a rapid reciprocating approaching and departing motion, by means of drive means consisting of a mechanical vibrations generator 1 on whose shaft 2 the sealing head 3 is mortised, said mechanical vibrations generator 1 being of a known type.

The thermoplastic films 5 and 6 to be sealed glide in the direction shown by the arrow in FIG. 1 between the sealing head and counter-plate; films 5 and 6 as shown in FIG. 1 separately enter from the upper side, slide between the sealing head and counterplate along a path that is parallel to the development direction of electric resistances 8 and come out sealed together from the lower part.

The rapid motion imparted to the sealing head by generator 1 gives rise to a hammering action onto the films that slide between the sealing head and counter-plate; said hammering, together with the softening brought about by the heat supplied by the short-time contact between the resistances 8 and the thermoplastic film, causes the thermoplastic films to become perfectly sealed.

The vibration frequency of the sealing head is kept at such a value, according to the length of the sealing head and the sliding speed of the films, that every point of the film receives several strokes. We have found that the best results are obtained when each point of the film is subjected to a number of strokes that is greater than five. The generator 1 can be a fixed frequency generator or, preferably, a variable frequency generator so as to be in a position to set the frequency that is the most suitable one for the sealing process.

According to the type of material and the thickness of the films to be sealed, the temperature of resistances 8, the frequency of hammering, the hammering strength and the sliding speed of the films to be sealed can be so adjusted as to achieve the best sealing conditions.

By means of the device that has been explained above, sealing of the thermoplastic films is achieved with a contact between films and heated elements of the sealing head lasting for a very short time and repeated several times; in this way it is possible to translate the films to be sealed at a high speed thereby achieving a remarkable reduction of the sealing times as the creeping of the films on the sealing head is quite limited. The short contact time between films and sealing head prevents moreover the softened film from sticking onto the head. This event is moreover prevented by the fact that it is possible to instantaneously control with the highest precision the temperature of the heated elements that cause the films to soften.

Both the motion of the films relative to the sealing head 3 and counter-plate 4 and the approaching/departing motion between head and counter-plate should clearly be understood as relative motions and can be obtained, according to the various construction and operation needs, by causing some items to be movable and the other ones fixed, or vice versa; for example, the relative gliding motion between the films and the sealing head - counter-plate assembly can be achieved with a sliding film but can also be achieved by having the sealing head-counter-plate assembly slide relative to the fixed film.

Various changes can be brought to the construction details of the present invention without departing from the invention thought as claimed in the claims.

I claim:

1. A device for continuous heat-sealing of a relatively moving thermoplastic film, said device comprising:
    a sealing head;
    a heated element on said sealing head;
    a counter-plate disposed in close proximity to said sealing head to define a sealing zone between said counter-plate and said sealing head to accommodate in said zone the relatively moving thermoplastic film;
    drive means operable for rapidly reciprocating said sealing head toward and away from said counter-plate so as to rapidly pound the relatively moving thermoplastic film between the sealing head heated element and the counter-plate and thereby effect heat sealing of the film; and
    spring means mounting said counter-plate for movement so that, as the sealing head is operatively reciprocated to pound the thermoplastic film between the sealing plate and counterplate, said reciprocated movement of the sealing head imparts movement to said counter-plate thereby enhancing said rapid pounding of the relatively moving thermoplastic film between the sealing head and counter-plate.

2. A device in accordance with claim 1, wherein said drive means operably reciprocates the sealing head at a frequency selected so that, as the thermoplastic film relatively moves through the sealing zone, each point to be sealed on the film undergoes at least five poundings.

3. A device in accordance with claim 1, wherein each of said sealing head and counter-plate includes a flat, mutually substantially parallel surface between which the thermoplastic film is accommodated and pounded, and said heated element comprises two heated substantially parallel bands on said sealing head surface and extending in the direction of relative movement of the thermoplastic film.

4. A device in accordance with claim 1, wherein said heated element comprises a heated band formed of an electricallyresistive material to which an electric potential is operatively applied for heating said band, the electrical resistance of said material being proportional to the temperature of the material.

5. A device in accordance with claim 1, wherein said heated element comprises an elongated heated band secured to the sealing head at the ends of said band, and elastic means disposed between said band and the sealing head for accommodating expansion of said band by maintaining the band under mechanical tension.

6. A device in accordance with claim 1, wherein said drive means comprises a mechanical vibration generator coupled to said sealing head.

* * * * *